US012640624B2

(12) United States Patent
Shanmukha et al.

(10) Patent No.: US 12,640,624 B2
(45) Date of Patent: May 26, 2026

(54) ELECTRIC MACHINE WITH COMBINED ROTOR AND COOLING FAN

(71) Applicants: Rolls-Royce plc, London (GB); Rolls-Royce Corporation, Indianapolis, IN (US)

(72) Inventors: Rama Krishna Shanmukha, London (GB); Anand Mathivanan, Indianapolis, IN (US); Jenn Yen Loh, Indianapolis, IN (US)

(73) Assignees: Rolls-Royce plc; Rolls-Royce Corporation, Indianapolis, IN (US)

( * ) Notice: Subject to any disclaimer, the term of this patent is extended or adjusted under 35 U.S.C. 154(b) by 867 days.

(21) Appl. No.: 17/887,961

(22) Filed: Aug. 15, 2022

(65) Prior Publication Data

US 2024/0055948 A1    Feb. 15, 2024

(51) Int. Cl.

| | |
|---|---|
| *H02K 9/06* | (2006.01) |
| *B64D 27/24* | (2024.01) |
| *B64D 33/08* | (2006.01) |
| *H02K 1/30* | (2006.01) |
| *H02K 1/32* | (2006.01) |
| *H02K 5/20* | (2006.01) |
| *H02K 7/00* | (2006.01) |

(52) U.S. Cl.
CPC ............... *H02K 9/06* (2013.01); *B64D 27/24* (2013.01); *B64D 33/08* (2013.01); *H02K 1/30* (2013.01); *H02K 1/32* (2013.01); *H02K 5/207* (2021.01); *H02K 7/003* (2013.01)

(58) Field of Classification Search
CPC . H02K 9/06; H02K 1/32; H02K 7/003; F04D 29/38

USPC .......................................................... 310/62
See application file for complete search history.

(56) References Cited

U.S. PATENT DOCUMENTS

| | | |
|---|---|---|
| 5,223,757 A | 6/1993 | Staub et al. |
| 5,557,153 A | 9/1996 | Zimmermann et al. |
| 6,239,520 B1 | 5/2001 | Stahl et al. |
| 6,459,179 B1 | 10/2002 | Lynch et al. |
| 7,489,057 B2 | 2/2009 | Zhou et al. |

(Continued)

FOREIGN PATENT DOCUMENTS

| | | |
|---|---|---|
| CN | 204721187 U | 10/2015 |
| DE | 9408559 U1 | 11/1994 |

(Continued)

OTHER PUBLICATIONS

English Translation of DE102015205724A (Year: 2016).*
Extended European Search Report for Application No. 23186283.0-1004, dated Oct. 11, 2023, 12 pages.

*Primary Examiner* — Terrance L Kenerly
*Assistant Examiner* — Theodore L Perkins
(74) *Attorney, Agent, or Firm* — Barnes & Thornburg

(57) ABSTRACT

An electric machine for use in an aircraft propulsion system includes a shaft, a magnetic rotor drum, and a rotor hub. The shaft extends along an axis and is configured to rotate about the axis. The magnetic rotor drum includes a rotor that extends circumferentially around the axis and a plurality of magnets that are arranged circumferentially around the rotor. The rotor hub extends radially between and interconnects the shaft and the rotor. The rotor hub is configured to move air along the electric machine to cool components thereof in response to rotation of the shaft about the axis.

15 Claims, 10 Drawing Sheets

(56)                   References Cited

U.S. PATENT DOCUMENTS

| | | | | |
|---|---|---|---|---|
| 8,242,645 | B2 | 8/2012 | Tatematsu et al. | |
| 9,148,041 | B2 | 9/2015 | Knoblauch et al. | |
| 9,154,019 | B2 | 10/2015 | Galler et al. | |
| 9,748,809 | B2 | 8/2017 | Daboussi et al. | |
| 10,418,882 | B2 | 9/2019 | Kaneko et al. | |
| 10,873,229 | B2 | 12/2020 | Sheppard et al. | |
| 11,205,931 | B2 * | 12/2021 | Fröhlich | H02K 7/003 |
| 2002/0195887 | A1 | 12/2002 | Kobayaski et al. | |
| 2004/0036367 | A1 * | 2/2004 | Denton | H02K 1/20 |
| | | | | 310/61 |
| 2005/0057106 | A1 | 3/2005 | Allen et al. | |
| 2007/0236098 | A1 | 10/2007 | Kusase et al. | |
| 2007/0273232 | A1 | 11/2007 | Ong et al. | |
| 2009/0085417 | A1 | 4/2009 | Vasilescu | |
| 2010/0231066 | A1 | 9/2010 | Korner | |
| 2012/0217756 | A1 | 8/2012 | Balzer et al. | |
| 2012/0242187 | A1 * | 9/2012 | Reinhart | H02K 1/30 |
| | | | | 29/598 |
| 2016/0329760 | A1 | 11/2016 | Major | |
| 2017/0257007 | A1 | 9/2017 | Braam et al. | |
| 2019/0103778 | A1 | 4/2019 | Paul et al. | |
| 2020/0186003 | A1 * | 6/2020 | Fröhlich | H02K 9/193 |

FOREIGN PATENT DOCUMENTS

| | | | | |
|---|---|---|---|---|
| DE | 19905538 | A1 | 8/2000 | |
| DE | 102013214082 | A1 | 1/2015 | |
| DE | 102015205724 | A1 * | 6/2016 | H02K 15/165 |
| DE | 102015205724 | B4 | 10/2016 | |
| EP | 1333561 | A2 | 8/2003 | |
| EP | 2109207 | A2 | 10/2009 | |
| EP | 0926805 | B1 | 4/2011 | |
| JP | 4398212 | | 1/2010 | |
| JP | 2014033584 | | 2/2014 | |
| WO | 2015188977 | A1 | 12/2015 | |

* cited by examiner

ELECTRIC MACHINE WITH COMBINED ROTOR AND COOLING FAN

FIELD OF THE DISCLOSURE

The present disclosure relates generally to electric machines adapted for use with gas turbine engines, and more specifically to air cooling the rotors of such electric machines.

BACKGROUND

Gas turbine engines are used to power aircrafts, watercrafts, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines may be used in a hybrid electric propulsion system used to power the aircraft. The hybrid electric propulsion system has an electric machine powered directly or indirectly form the gas turbine engine. The electric machine is configured to power a propeller for providing thrust for the aircraft.

Electric machines generate heat during use and may need to be cooled during operation of the system. Separate external fans may be used to cool the electric machine; however, the external fans add weight to the aircraft and result in components of the electric machine being modified to provide the cooling air therein. A lightweight, non-intrusive component of the electric machine to cool the magnetic rotor drum is desired.

SUMMARY

The present disclosure may comprise one or more of the following features and combinations thereof.

An electric machine adapted for use in an aircraft propulsion system may include a shaft extending along an axis, a magnetic rotor drum, and a rotor hub. The shaft may be configured to rotate about the axis. The magnetic rotor drum may include a rotor drum body and a plurality of magnets arranged circumferentially about the axis and coupled with the rotor drum body for rotation therewith. The rotor hub may interconnect the shaft and the magnetic rotor drum. The rotor hub may move air surrounding the electric machine in response to rotation of the shaft about the axis to cool the shaft and the magnetic rotor drum.

In some embodiments, the rotor hub may include a cylindrical body and a plurality of first fan blades. The cylindrical body may extend around the axis to define a hollow cavity. The plurality of first fan blades may extend radially between the shaft and the cylindrical body to draw air axially along the shaft toward the magnetic rotor drum at a first radial distance and transfer heat from the electric machine to the air. Additionally, the plurality of fan blades may urge the air axially away from the magnetic rotor drum at a second radial distance greater than the first radial distance.

In some embodiments, the shaft may be formed to include a cooling passage. The cooling passage may extend axially through the shaft and opens into the hollow cavity.

In some embodiments, the plurality of first fan blades may extend radially between and interconnect the shaft and the cylindrical body such that rotation of the shaft about the axis causes the plurality of first fan blades to draw the air axially along the shaft in the cooling passage and into the hollow cavity at the first radial distance. Additionally, rotation of the shaft about the axis may also cause the plurality of first fan blades to urge the air between the plurality of first fan blades axially away from the magnetic rotor drum at the second radial distance.

In some embodiments, the shaft may include a first segment and a second segment. The first segment may be coupled with the rotor hub. The second segment may be spaced apart axially from the first segment and coupled with the rotor hub. The first segment may be formed to define the cooling passage that is in fluid communication with the hollow cavity. In some embodiments, the second segment of the shaft may be formed without a cooling passage that extends through the second segment of the shaft and fluidly opens into the hollow cavity.

In some embodiments, the plurality of first fan blades may extend between the first segment of the shaft and the cylindrical body. The rotor hub may further include a plurality of second fan blades that interconnect the second segment of the shaft and the cylindrical body. The plurality of second fan blades may move the air surrounding the electric machine in response to rotation of the shaft about the axis.

In some embodiments, the shaft and the rotor hub may be integrally formed. The shaft and the rotor hub may be integrally formed as a single, one-piece component.

In some embodiments, the cylindrical body may include a ring and a keying feature. The keying feature may extend radially outward of the ring and into a slot formed in the rotor drum body to key the rotor hub with the magnetic rotor drum.

In some embodiments, each of the blades included in the plurality of first fan blades may have a fan blade length and a fan blade chord length. A fan blade ratio of the fan blade length to the fan blade chord length may be about 1.

In some embodiments, the electric machine may further include a stator. The stator may extend circumferentially around the magnetic rotor drum. The stator may include electrical windings.

According to another aspect of the present disclosure, an electric machine adapted for use in an aircraft propulsion system may include a shaft, a magnetic rotor drum, and a rotor hub. The shaft may extend along an axis and may be configured to rotate about the axis.

In some embodiments, the magnetic rotor drum may include a rotor drum body and a plurality of magnets. The plurality of magnets may be arranged circumferentially about the axis and may be coupled with the rotor drum body for rotation therewith.

In some embodiments, the rotor hub may include a cylindrical body and a plurality of first fan blades arranged circumferentially around the axis. The cylindrical body may be coupled with the rotor drum body. The cylindrical body may extend circumferentially around the axis to define a hollow cavity therein. The plurality of first fan blades may extend radially between the shaft and the cylindrical body.

In some embodiments, the rotor hub may further include a plurality of second fan blades. The plurality of second fan blades may extend between and interconnect the shaft and the cylindrical body. The plurality of second fan blades may be spaced apart axially from the plurality of first fan blades.

In some embodiments, the shaft may include a first segment coupled with the rotor hub and a second segment spaced apart axially from the first segment and coupled with the rotor hub, the plurality of first fan blades extend between and interconnect the first segment and the cylindrical body, the plurality of second fan blades extend between and interconnect the second segment and the cylindrical body.

In some embodiments, the first segment may be formed to define a cooling passage. The cooling passage may extend axially through the first segment and may fluidly open into the hollow cavity.

In some embodiments, the shaft may be formed to define a cooling passage. The cooling passage may extend axially through the shaft and may fluidly open into the hollow cavity.

In some embodiments, the electric machine may further include a stator. The stator may extend circumferentially around the magnetic rotor drum. The stator may include electrical windings.

In some embodiments, the cylindrical body may include a ring and a keying feature. The keying feature may extend radially outward of the ring and into a slot formed in the rotor drum body to key the rotor hub with the magnetic rotor drum.

In some embodiments, the shaft, the cylindrical body, and the plurality of first fan blades may be integrally formed. The shaft, the cylindrical body, and the plurality of first fan blades may be integrally formed as a single, one-piece component.

In some embodiments, the rotor hub may further include a plurality of second fan blades. The plurality of second fan blades may extend radially between the shaft and the cylindrical body.

In some embodiments, the plurality of first fan blades may be configured to urge air out of the hollow cavity in a first axial direction. The plurality of second fan blades may be configured to urge the air out of the hollow cavity in a second axial direction opposite the first axial direction.

According to another aspect of the present disclosure, a method may include providing an electric machine having a shaft, a magnetic rotor drum, and a rotor hub. The magnetic rotor drum may include a rotor drum body and a plurality of magnets arranged circumferentially about an axis and coupled with the rotor drum body for rotation therewith.

In some embodiments, the rotor hub may have a cylindrical body coupled with the rotor drum body and a plurality of first fan blades. The cylindrical body may define a hollow cavity therein. The plurality of first fan blades may extend between and interconnect the shaft and the cylindrical body.

In some embodiments, the method may further include rotating the electric machine. The electric machine may be rotated such that the plurality of first fan blades draw air axially along the shaft toward the rotor drum body at a first radial distance to transfer heat from the electric machine to the air and. Additionally, the electric machine may be rotated such that the plurality of first fan blades urge the air axially away from the rotor drum body at a second radial distance greater than the first radial distance.

In some embodiments, drawing the air axially along the shaft may include drawing the air through a cooling passage. The cooling passage may be formed in the shaft. The cooling passage may open fluidly into the hollow cavity.

These and other features of the present disclosure will become more apparent from the following description of the illustrative embodiments.

DETAILED DESCRIPTION OF THE DRAWINGS

Figure 1:
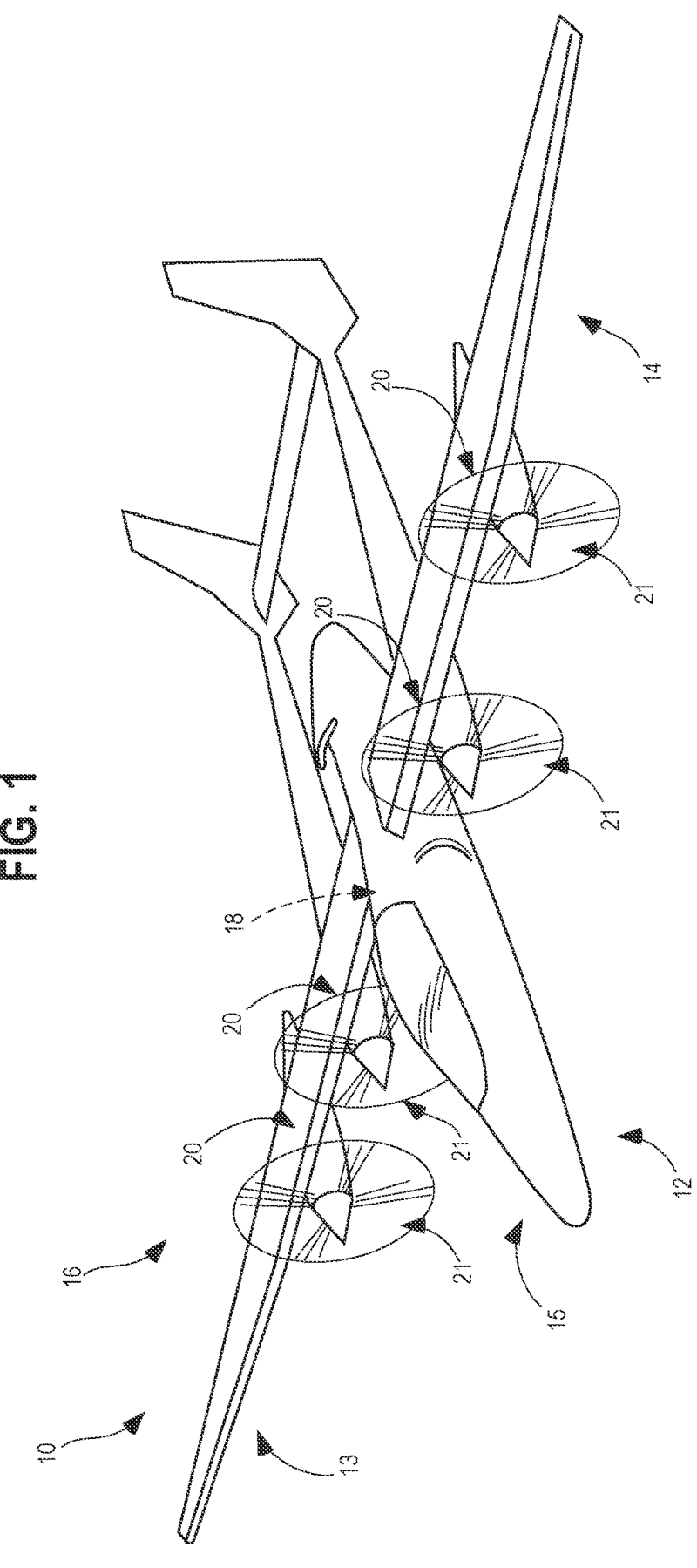
FIG. 1 a perspective view of an aircraft showing the aircraft including an airframe with wings and a hybrid electric propulsion system having a gas turbine engine and an electric machine in accordance with the present disclosure coupled with one of the propellers and configured to power the propeller for providing thrust for the aircraft.

For the purposes of promoting an understanding of the principles of the disclosure, reference will now be made to a number of illustrative embodiments illustrated in the drawings and specific language will be used to describe the same.

Figure 2:
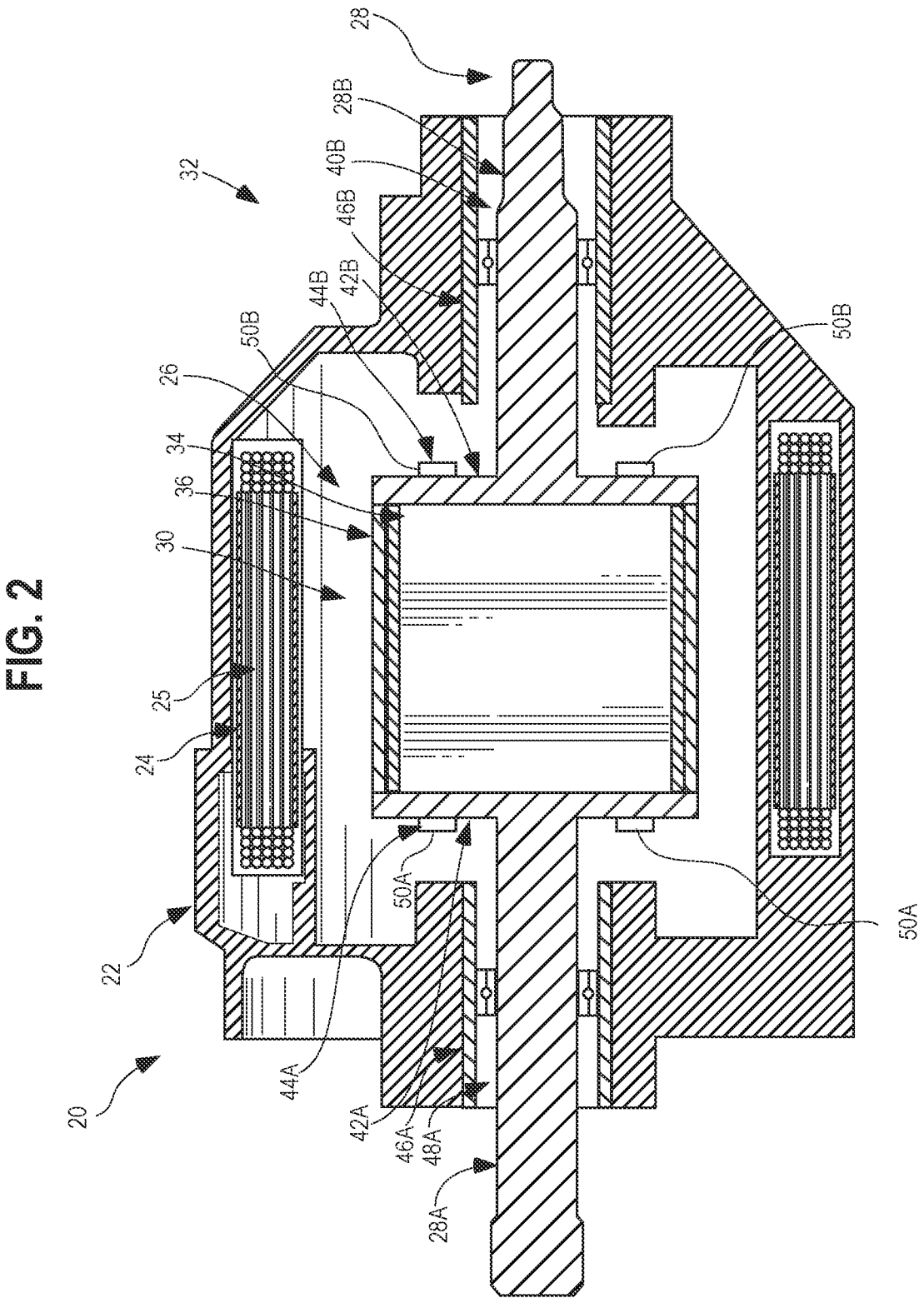
FIG. 2 is a cross-sectional view of the electric machine of FIG. 1 showing that the electric machine includes a rotor assembly and a stator arranged around the rotor assembly, the rotor assembly including a shaft, a magnetic rotor drum, and a non-magnetic rotor hub having air moving means for moving air surrounding the electric machine toward and away from the magnetic rotor drum in response to rotation of the shaft about the axis to cool the shaft and the magnetic rotor drum.

An aircraft 10 having an electric machine 20 in accordance with the present disclosure is shown, for example, in FIG. 1. The aircraft 10 includes an airframe 12 with wings 13, 14 extending from a fuselage 15 and an electric propulsion system 16. The electric propulsion system 16 includes a gas turbine engine 18, an electric machine 20, and a propeller 21 or other propulsor as shown in FIGS. 1 and 2. In some embodiments, the electric propulsion system further includes one or more generators, motors, and/or batteries. In the illustrative embodiment, the electric machine 20 is a motor. In some embodiments, the electric machine 20 is a motor-generator.

The electric machine 20 includes a case 22, a stator 24 coupled with the case 22, and a rotor assembly 26 supported by the case 22 as shown in FIG. 2. The rotor assembly 26 is configured to rotate about an axis 11 relative to the case 22 and the stator 24. The stator 24 is around the rotor assembly 26.

The electric machine 20 generates heat during use, which may cause the temperature of the rotor assembly 26 to increase without any active cooling. This may reduce the operating life of the electric machine 20. Other rotor cooling systems may use external fans to actively cool the electric machine 20. However, the external fan structure adds weight to the system 16.

Therefore, the rotor assembly 26 of the electric machine 20 includes a rotor hub 32 having air moving means for moving air surrounding the motor toward and away from the rotor assembly 26 of the rotor assembly in response to rotation of the rotor assembly 26 about the axis 11. The air transfers heat from a shaft 28 and a magnetic rotor drum 30 included in the rotor assembly 26 to cool the shaft 28 and the magnetic rotor drum 30.

Figure 3:
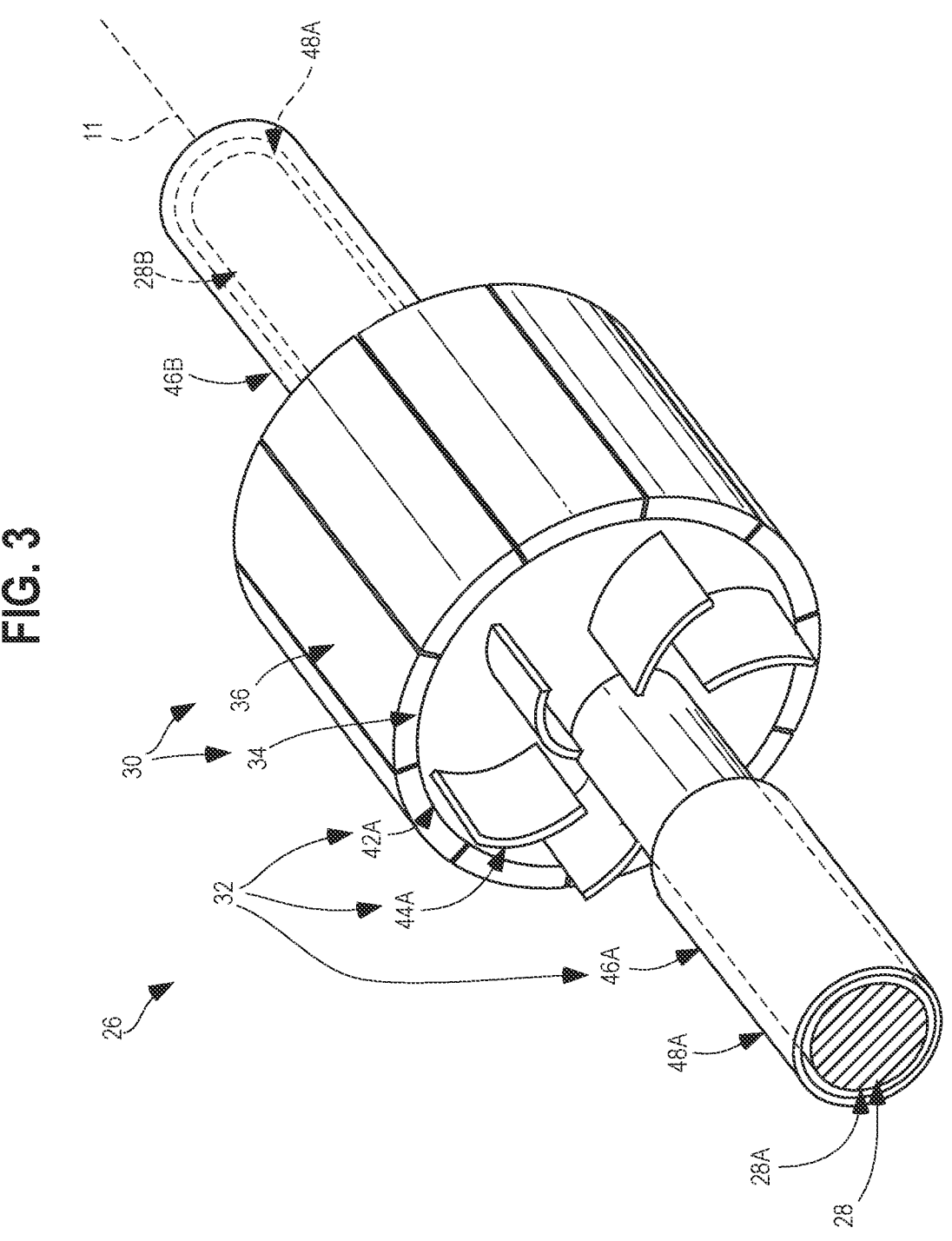
FIG. 3 is a perspective view of the rotor assembly included in the electric machine of FIG. 2 showing that the rotor assembly includes the shaft extending along the axis, the magnetic rotor drum including a rotor drum body and a plurality of magnets coupled with the rotor drum body, and the non-magnetic rotor hub that interconnects the shaft and the rotor drum body of the magnetic rotor drum.
Figure 4:
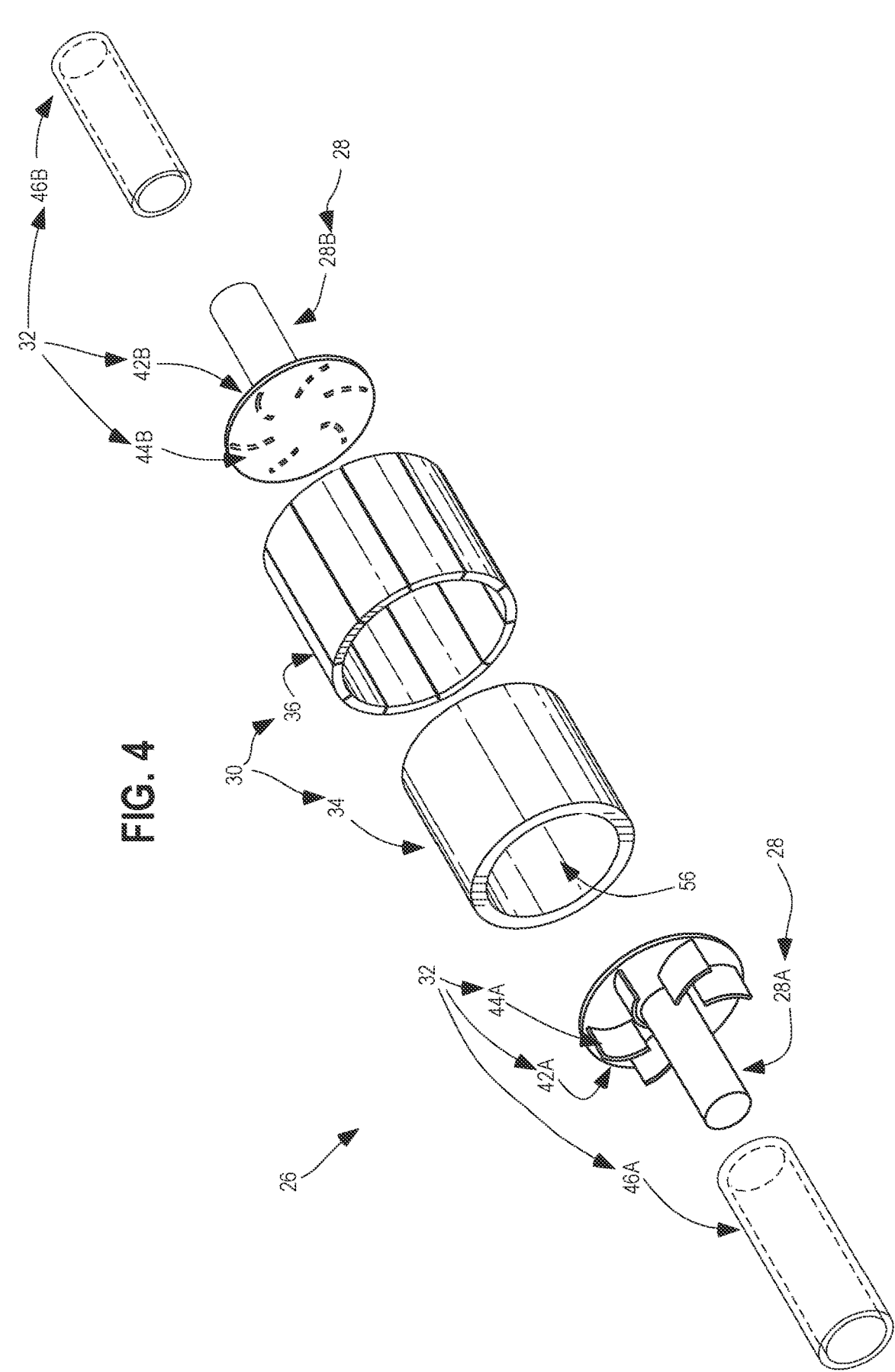
FIG. 4 is an exploded view of the rotor assembly of FIG. 3 showing the air moving means includes rotor end caps each configured to extend radially between the shaft and the magnetic rotor drum on either side of the magnetic rotor drum, impellers configured to be coupled to the respective rotor end cap to extend axially away from the respective rotor end cap, and baffles each configured to be arranged around one end of the shaft so as to form passages radially therebetween.
Figure 5:
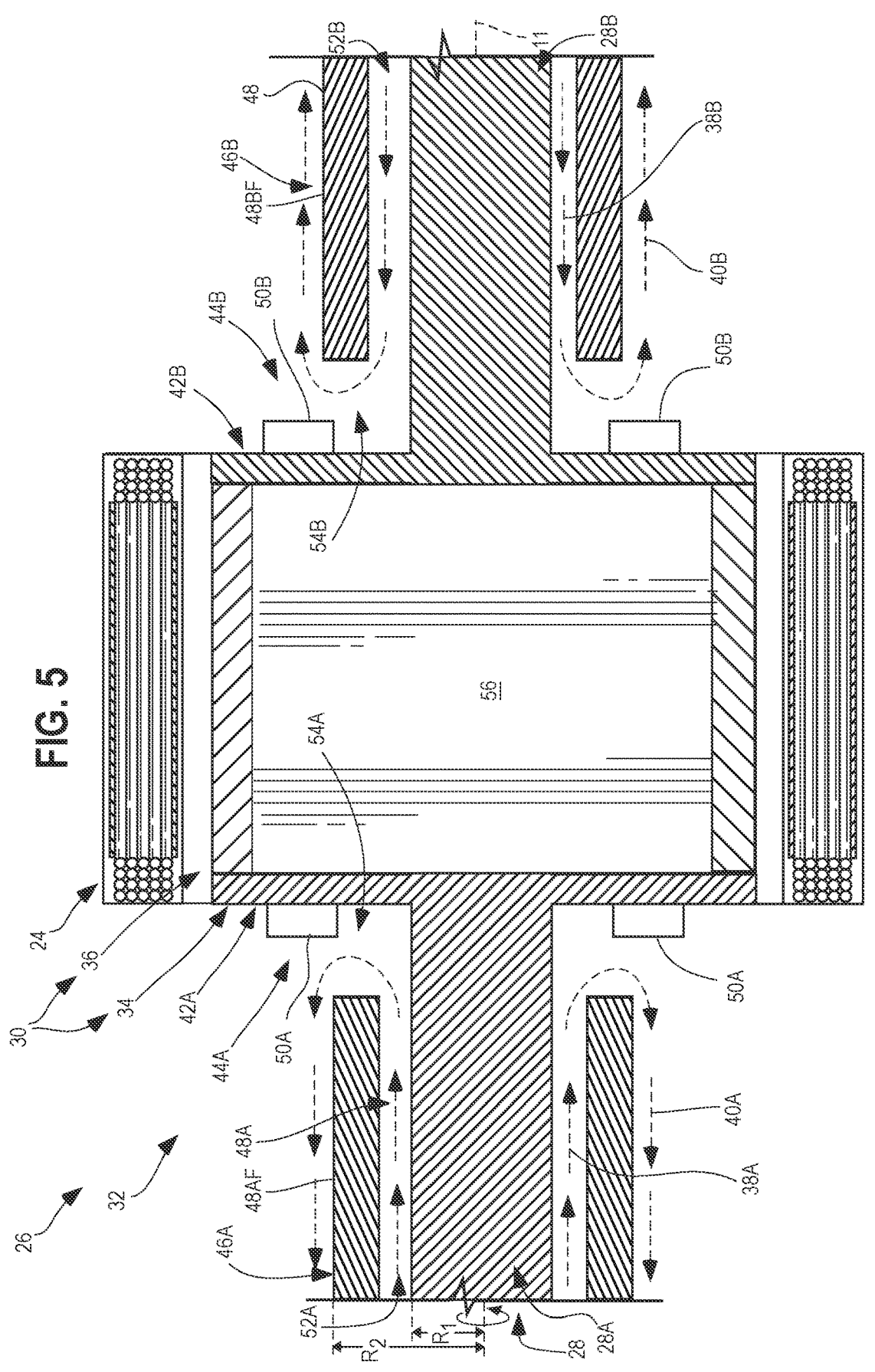
FIG. 5 is a cross-sectional view of the rotor assembly in FIG. 3 showing that rotation of the shaft causes the air moving means to draw air surrounding the electric machine axially along the shaft through the passages defined radially between the baffles and the shaft toward the magnetic rotor drum to transfer heat from the shaft to the air and to urge the heated air axially away from the magnetic rotor drum as it exits the passages along a radial outer face of the baffles.

The air moving means includes a rotor end cap 42A, 42B and an impeller 44A, 44B as shown in FIGS. 3-5. The rotor end cap 42A, 42B extends radially between the shaft 28 and a rotor drum body 34 of the magnetic rotor drum 30. The impeller 44A, 44B extends axially away from the rotor end cap 42A, 42B.

In the illustrative embodiment, the air moving means includes a rotor end cap 42A, 42B and an impeller 44A, 44B and a baffle 46A, 46B for each side of the magnetic rotor drum 30 as shown in FIGS. 3-5. Each rotor end cap 42A, 42B extends radially between the shaft 28 and the rotor drum body 34 of the magnetic rotor drum 30 on either side of the rotor drum body 34. Each impeller 44A, 44B extends axially away from the respective rotor end cap 42A, 42B.

Rotation of the shaft 28 causes the impellers 44A, 44B to draw the air surrounding the electric machine 20 axially along the shaft 28 toward the rotor drum body 34 of the magnetic rotor drum 30, as suggested by arrows 38A, 38B. The air flowing axially along the shaft 28 toward the rotor drum body 34 transfers heat from the shaft 28 to the air. The heated air is then urged axially away from the rotor drum body 34 of the magnetic rotor drum 30, as suggested by arrows 40A, 40B. In the illustrative embodiment, the air moving means draws air axially along the shaft 28 toward the rotor drum body 34 at a first radial distance $R_1$ and urges the air axially away from the rotor drum body 34 at a second radial distance $R_2$ greater than the first radial distance $R_1$.

The rotor hub 32 includes a baffle 46A, 46B that extends circumferentially around the shaft 28 to prevent mixing of the two air flows 38A, 38B or 40A, 40B. Mixing of the air flows 38A, 38B or 40A, 40B may reduce the cooling efficiency.

The baffle 46A, 46B is spaced apart radially from the shaft 28 so as to form a passage 48A, 48B radially therebetween as shown in FIGS. 3-5. In this way, upon rotation of the shaft 28, the air is drawn axially along the shaft 28 at the first radial distance $R_1$ in the passage 48A, 48B, as suggested by arrows 38A, 38B. The air flowing through the passages 48A, 48B transfers heat from the shaft 28 to the air. Simultaneously, as the air exits the passages 48A, 48B, the air is urged axially away from the magnetic rotor drum 30 at the second radial distance $R_2$ along a radial outer face 46AF, 46BF of the baffle 46A, 46B, as suggested by arrows 40A, 40B.

In the illustrative embodiment, the rotor hub 32 includes a baffle 46A, 46B for each end of the shaft 28. Each baffle 46A, 46B extends circumferentially around one end of the shaft 28 and is spaced apart radially from the shaft 28 so as to form the passages 48A, 48B radially therebetween.

Turning again to the electric machine 20, the electric machine 20 is powered directly or indirectly from the gas turbine engine 18 and/or one or more batteries. The gas turbine engine 18 combusts compressed air and fuel to produce rotational mechanical power. The rotational mechanical power produced by the gas turbine engine may be directly transferred to the electric machine 20 to drive rotation of the electric machine 20, as contemplated for the illustrative embodiment.

In other embodiments, the rotational mechanical power is used to drive rotation of a generator to produce electrical energy. The electrical energy from the generator may be transmitted to the electric machine 20 to drive rotation of the electric machine 20 and/or may be transmitted to the one or more batteries for storage and use by the electric machine 20 at a later time.

The electric machine 20 includes the case 22, the stator 24, and the rotor assembly 26 as shown in FIG. 2. The case 22 is included in or coupled with a nacelle that is fixed with one of the wings 13, 14. The stator 24 includes a plurality of windings 25 that are arranged around the axis 11. For example, the windings 25 include coper windings configured to be electrically energized to provide an electromagnetic field. The rotor assembly 26 is coupled with the propeller 21. The rotor assembly 26 includes the magnetic rotor drum 30 having a plurality of magnets 36 and is configured to be driven to rotate about the axis 11 by the energized stator 24 to drive the propeller 21.

The rotor assembly 26 includes the shaft 28, the magnetic rotor drum 30, and the rotor hub 32 as shown in FIGS. 3-5. The shaft 28 extends along the central axis 11 and is rotatable about the axis 11 to drive the magnetic rotor drum 30. The magnetic rotor drum 30 includes a rotor drum body 34 and the plurality of magnets 36 coupled to the rotor drum body 34. The rotor hub 32 interconnects shaft 28 and the magnetic rotor drum 30 and is configured move air that surrounds the electric machine 20 to cool the magnetic rotor drum 30 in response to rotation of the shaft 28 about the axis 11.

The rotor hub 32 is formed with the air moving means for drawing air surrounding the electric machine 20 axially along the shaft 28 toward the magnetic rotor drum 30 (as suggested by arrows 38A, 38B) to transfer heat from the shaft 28 to the air and for urging the heated air axially away from the rotor drum body 34 of the magnetic rotor drum 30 (as suggested by arrows 40A, 40B) as shown in FIG. 5. In the illustrative embodiment, the air moving means draws air axially along the shaft 28 toward the rotor drum body 34 at the first radial distance $R_1$ and urges the air axially away from the rotor drum body 34 at the second radial distance $R_2$ greater than the first radial distance $R_1$.

The rotor hub 32 includes the rotor end caps 42A, 42B, the impellers 44A, 44B, and the baffles 46A, 46B as shown in FIGS. 3-5. Each rotor end cap 42A, 42B extends radially between the shaft 28 and the rotor drum body 34 of the magnetic rotor drum 30 on either side of the rotor drum body 34. Each impeller 44A, 44B extends axially away from the respective rotor end cap 42A, 42B. Each baffle 46A, 46B extends circumferentially around one end of the shaft 28 and is spaced apart radially from the shaft so as to form a passage 48A, 48B radially therebetween.

At one end of the shaft 28, the first rotor end cap 42A extends between the shaft 28 and the rotor drum body 34 of the magnetic rotor drum 30 and the first impeller 44A extends axially away from the first rotor end cap 42A. The first baffle 46A arranged around the shaft 28 to define a first passage 48A.

At the other end of the shaft 28, the second rotor end cap 42B extends between the shaft 28 and the rotor drum body 34 of the magnetic rotor drum 30 and the second impeller 44B extends axially away from the second rotor end cap 42B. The second baffle 46B arranged around the shaft 28 to define a second passage 48B.

In the illustrative embodiment, the rotor end caps 42A, 42B and the impellers 44A, 44B provide the air moving means. Rotation of the shaft 28 causes the impellers 44A, 44B to draw the air surrounding the electric machine 20 axially along the shaft 28 through the passages 48A, 48B toward the rotor drum body 34, as suggested by arrows 38A, 38B. The air flowing through the passages 48A, 48B transfers heat from the shaft 28 to the air. Simultaneously, as the air exits the passages 48A, 48B, the impellers 44A, 44B urge the heated air axially away from the magnetic rotor drum 30 along the radial outer face 46AF, 46BF of each of the baffles 46A, 46B, as suggested by arrows 40A, 40B.

Each of the rotor end caps 42A, 42B encases an axial end 34A, 34B of the rotor drum body 34 to close off a hollow cavity 56 of the rotor drum body 34 as shown in FIG. 5. Each of the rotor end caps 42A, 42B encases the axial end 34A, 34B of the rotor drum body 34 to block fluid communication with the hollow cavity 56 through the axial ends 34A, 34B of the rotor drum body 34. The first rotor end cap 42A encases the first axial end 34A of the rotor drum body 34, while the second rotor end cap 42B encases the second axial end 34B of the rotor drum body 34.

In the illustrative embodiment, the shaft 28, the rotor drum body 34 of the magnetic rotor drum 30, and the rotor end caps 42A, 42B are integrally formed as a single, one-piece component. In other embodiments, the shaft 28, the rotor drum body 34 of the magnetic rotor drum 30, and the rotor end caps 42A, 42B may be formed separately and assembled.

Each of the impellers 44A, 44B includes a plurality of discrete protrusions 50A, 50B as shown in FIGS. 3-5A. The protrusions 50A, 50B spaced apart circumferentially around the axis 11. In the illustrative embodiment the protrusions 50A, 50B are blades.

Figure 5B:
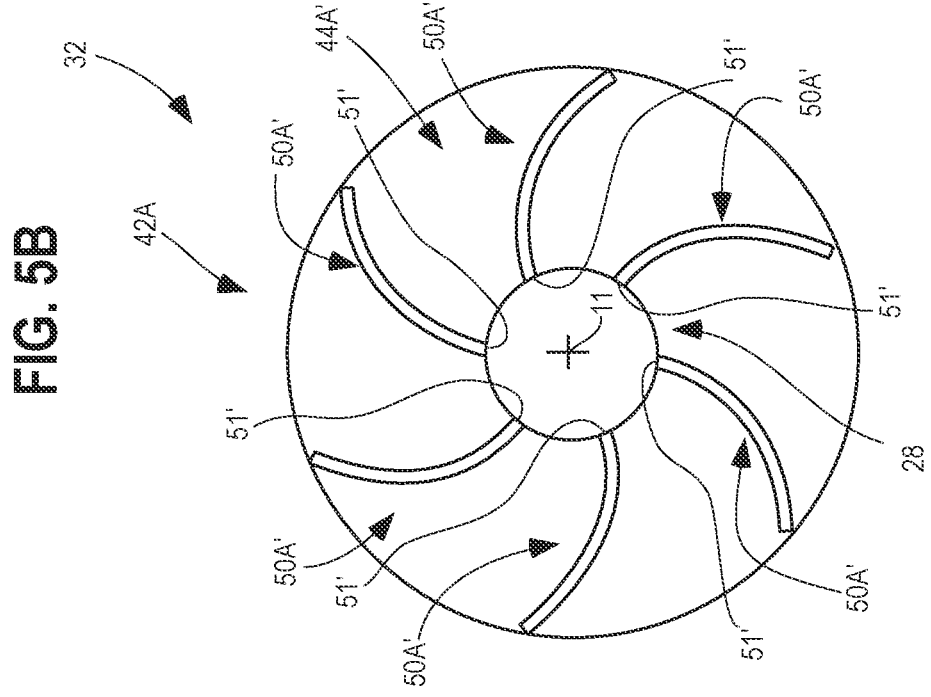
FIG. 5B is an elevation view of another embodiment of a rotor hub adapted for use in the rotor assembly of FIG. 2 showing the plurality of blades may extend radially away from the shaft.
Figure 5A:
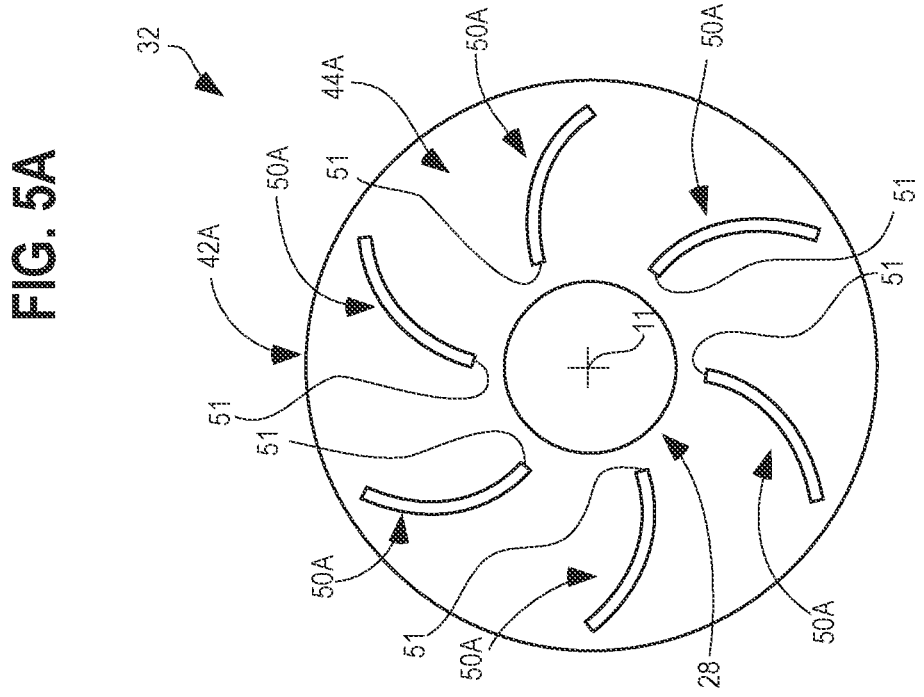
FIG. 5A is an elevation view of the rotor hub included in rotor assembly of FIG. 2 showing the impeller includes a plurality of blades integrally formed with the rotor end cap that are spaced circumferentially around the axis, and further showing the plurality of blades is spaced apart radially from the shaft.

In illustrative embodiment, the blades 50A, 50B are integrally formed with the respective rotor end cap 42A, 42B and are spaced apart circumferentially around the axis 11 as shown in FIG. 5A. In other embodiments, the blades 50A, 50B are formed separately and coupled to the respective rotor end cap 42A, 42B with fasteners. The separately formed blades 50A, 50B may be formed from a non-metallic material so that the blades 50A, 50B will not influence the electromagnetic performance of the electric machine 20.

Each of the blades 50A, 50B has a fan blade length and a fan blade chord length as shown in FIGS. 3 and 5. The fan blade length is the length of the blade 50A, 50B from a base of the blade 50A, 50B to a tip of the blade 50A, 50B. The chord length is the length of the blade 50A, 50B from a leading edge to a trailing edge of the blade 50A, 50B.

In the illustrative embodiment, a fan blade ratio of the fan blade length to the fan blade chord length is about 1. In other embodiments, the fan blade ratio may be about 0.9. In other embodiments, the fan blade ratio may be between about about 0.9 and 1.1

The shape of the blades 50A, 50B may be altered to increase the cooling of the shaft 28 and rotor drum body 34. Additionally, the direction angle of each of the impellers 44A, 44B may be altered to increase the cooling of the shaft 28 and rotor drum body 34.

In the illustrative embodiment of FIG. 5A, the chord length of the blades 50A is configured so that an edge 51 of each of the blades 50A is spaced apart radially from the shaft 28 as shown in FIG. 5A. In another embodiment, the chord length of the blades 50A' is longer than that of the blades 50A such that the edge 51' confronts the shaft 28 as shown in FIG. 5B.

Each of the baffles 46A, 46B is spaced apart radially from the shaft 28 and spaced apart axially from the respective rotor end cap 42A, 42B so that the air is drawn axially along the shaft 28 at the first radial distance $R_1$ in the passages 48A, 48B and the air is urged axially away from the magnetic rotor drum 30 at the second radial distance $R_2$ along the radial outer face 46AF, 46BF of the baffles 46A, 46B. The radial distances $R_1$, $R_2$ may be varied by altering the diameter and thickness of the baffles 46A, 46B. In the illustrative embodiment, each of the baffles 46A, 46B is spaced apart axially from the respective rotor end cap 42A, 42B so as to define an inlet opening 52A, 52B and an outlet opening 54A, 54B for the passage 48A, 48B as shown in FIG. 5.

A method of cooling the electric machine 20 includes rotating the shaft 28 of the electric machine 20 to cause the plurality of blades 50A, 50B included in the impellers 44A, 44B to draw air axially along the shaft 28 toward the rotor drum body 34 at the first radial distance $R_1$ to transfer heat from the shaft 28 to the air. Rotation of the shaft 28 also causes the plurality of blades 50A, 50B included in the impellers 44A, 44B to urge the air axially away from the rotor drum body 34 at the second radial distance $R_2$.

In the illustrative embodiment, the method includes drawing the air between the baffles 46A, 46B and the shaft 28. Rotation of the shaft 28 causes the plurality of blades 50A, 50B included in the impellers 44A, 44B to draw air through the inlet openings 52A, 52B axially along the shaft 28 in the passages 48A, 48B toward the rotor drum body 34. As the air exits through the outlet openings 54A, 54B of the passages 48, 48B, the impellers 44A, 44B urge the air axially away from the rotor drum body 34.

Another embodiment of an electric machine 220 in accordance with the present disclosure is shown in FIGS. 6-9. The electric machine 220 is substantially similar to the electric machine 20 shown in FIGS. 1-5 and described herein. Accordingly, similar reference numbers in the 200 series indicate features that are common between the electric machine 20 and the electric machine 220. The description of the electric machine 20 is incorporated by reference to apply to the electric machine 220, except in instances when it conflicts with the specific description and the drawings of the electric machine 220.

Figure 6:
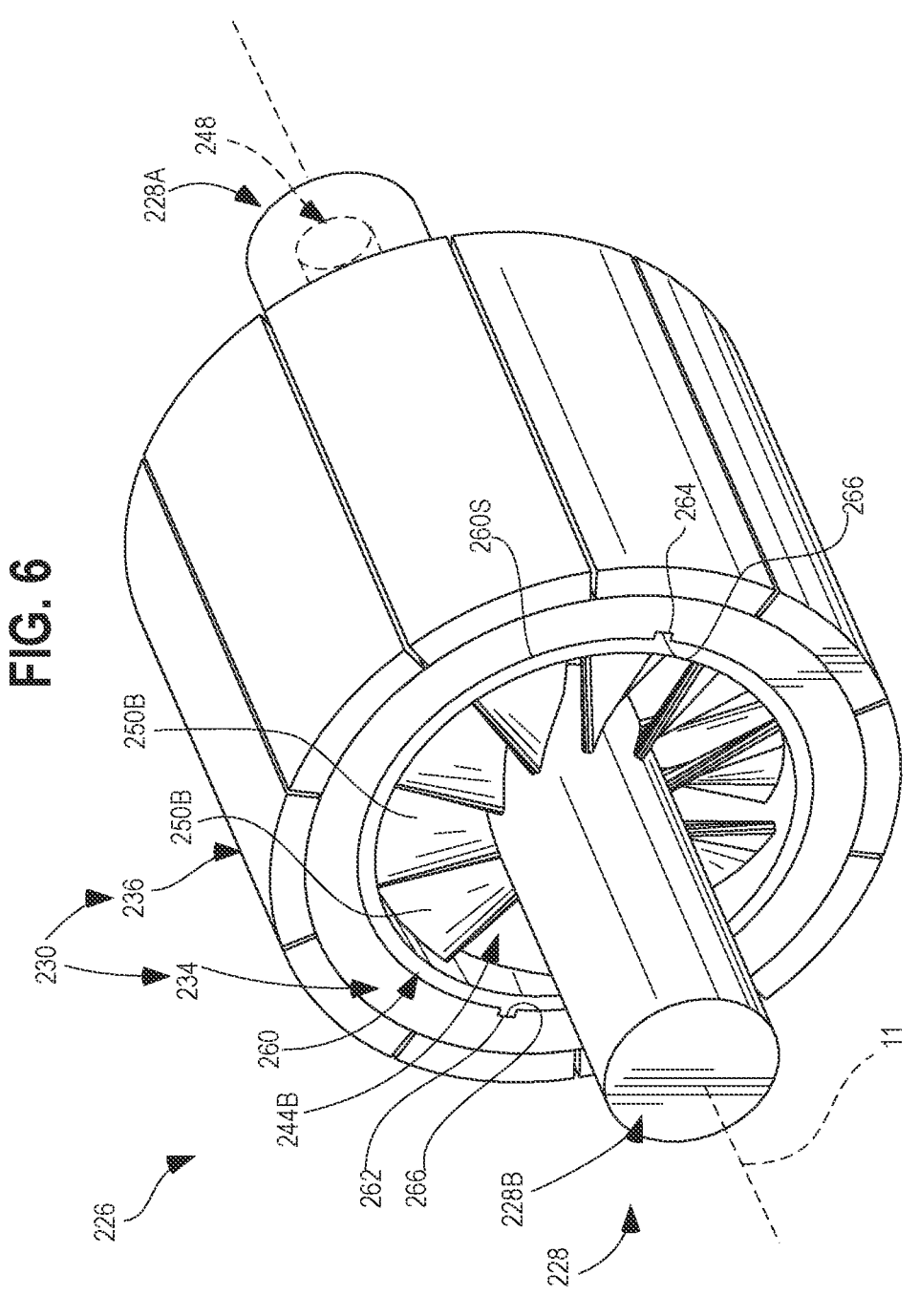
FIG. 6 is front perspective view of another embodiment of a rotor assembly included in the electric machine of FIG. 2 showing the rotor assembly includes a shaft, a magnetic rotor drum with a rotor drum body and a plurality of magnets, and a rotor hub that interconnects the shaft and the magnetic rotor drum, and further showing the rotor hub has air moving means integrally formed with the shaft for moving air surrounding the electric machine toward and away from the magnetic rotor drum in response to rotation of the shaft about the axis to cool the shaft and the magnetic rotor drum.

The electric machine 220 includes a case (not shown), a stator 224, and a rotor assembly 226 as shown in FIG. 6. The stator 24 includes a plurality of windings 225 that are arranged around the axis 11. The rotor assembly 226 is coupled with the propeller 21. The rotor assembly 226 includes a magnetic rotor drum 230 having a plurality of magnets 236 and is configured to be driven to rotate about the axis 11 by the energized stator 224 to drive the propeller 21.

The rotor assembly 226 includes a shaft 228, the magnetic rotor drum 230, and a rotor hub 232 as shown in FIGS. 6-9. The shaft 228 extends along the central axis 11 and is rotatable about the axis 11 to drive the magnetic rotor drum 230. The magnetic rotor drum 230 includes a rotor drum body 234 and the plurality of magnets 236 coupled to the rotor drum body 234. The rotor hub 232 interconnects the shaft 228 and the magnetic rotor drum 230 and is configured move air that surrounds the electric machine 220 to cool the magnetic rotor drum 230 in response to rotation of the shaft 228 about the axis 11.

Figure 9:
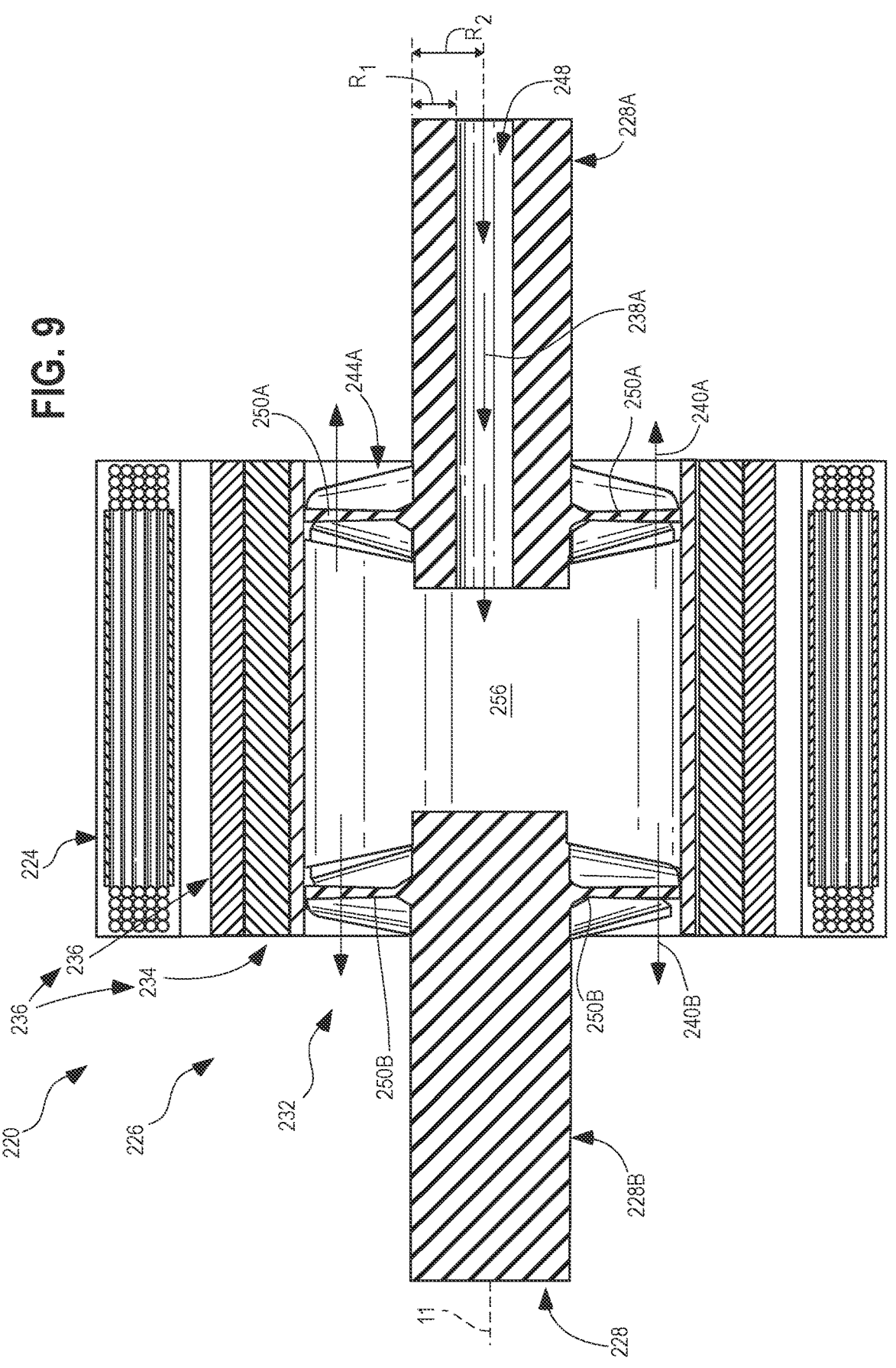
FIG. 9 is a cross-sectional view of the rotor assembly in FIG. 6 showing that rotation of the shaft causes the air moving means to draw air surrounding the electric machine axially along the shaft in the cooling passage toward the magnetic rotor drum and into the hollow cavity to transfer heat from the shaft to the air and to urge the air in the hollowing cavity between the fan blades axially away from the magnetic rotor drum.

The rotor hub 232 is formed with the air moving means for drawing air surrounding the electric machine 220 axially along the shaft 228 toward the rotor drum body 234 (as suggested by arrows 238A, 238B) to transfer heat from the shaft 228 to the air and for urging the heated air axially away from the rotor drum body 234 of the magnetic rotor drum 230 (as suggested by arrows 240A, 240B) as shown in FIG. 9. In the illustrative embodiment, the air moving means draws air axially along the shaft 228 toward the rotor drum body 234 at the first radial distance $R_1$ and urges the air axially away from the rotor drum body 234 at the second radial distance $R_2$ greater than the first radial distance $R_1$.

The rotor hub 232 includes a cylindrical body 242 and a plurality of fan blades 244A, 244B. The cylindrical body 242 extends around the axis 11 to define a hollow cavity 256. The plurality of fan blades 244A, 244B that extend radially between the shaft 228 and the cylindrical body 242 to draw air axially along the shaft 228 toward the rotor drum body 234 to transfer heat from the electric machine 220 and urge the air axially away from the rotor drum body 234. The plurality of fan blades 244A, 244B draws the air toward the rotor drum body 234 at the first radial distance $R_1$ and urges the air axially away from the rotor drum body 234 at the second radial distance $R_2$ greater than the first radial distance $R_1$ as shown in FIG. 9.

Figure 8:
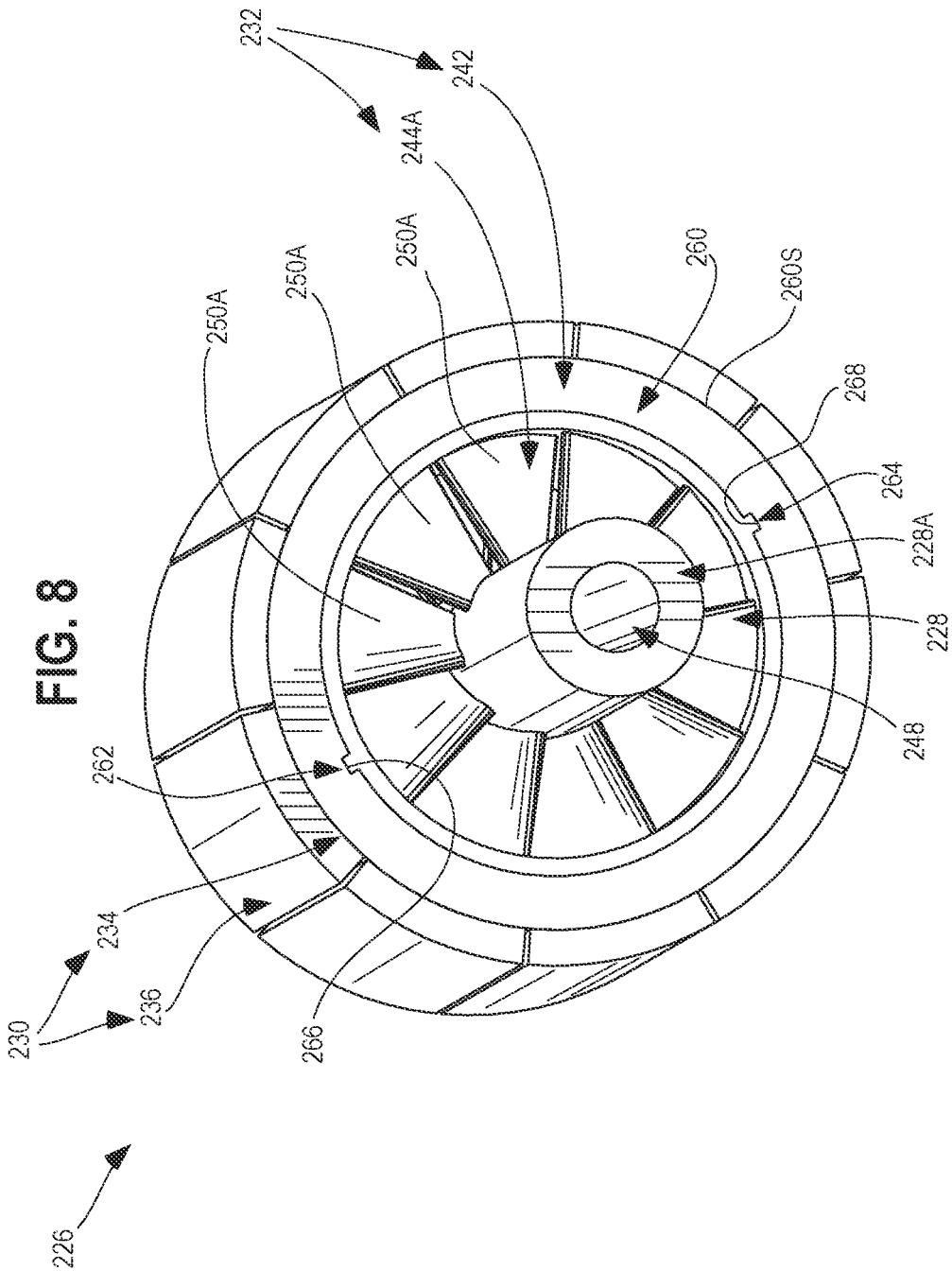
FIG. 8 is a rear perspective view of the rotor assembly of FIG. 6 showing the air moving means includes the plurality of fan blades and a cooling passage that extends axially through the shaft and opens into the hollow cavity.

The shaft 228 is formed to include a cooling passage 248 that extends axially through the shaft 228 and opens into the hollow cavity 256 of the cylindrical body 242 of the rotor hub 232 as shown in FIGS. 8 and 9. The plurality of fan blades 244A, 244B extend radially between and interconnect the shaft 228 and the cylindrical body 242 such that rotation of the shaft 228 about the axis 11 causes the plurality of fan blades 244A, 244B to draw the air axially along the shaft 228 in the cooling passage 248 and into the hollow cavity 256. Additionally, rotation of the shaft 228 about the axis 11 causes the plurality of fan blades 244A, 244B to urge the air between the plurality of fan blades 244A, 244B axially away from the magnetic rotor drum 230. The air is drawn along the shaft 228 in the cooling passage 248 toward the rotor drum body 234 at the first radial distance $R_1$. The air is urged axially away from the rotor drum body 234 at the second radial distance $R_2$.

Figure 7:
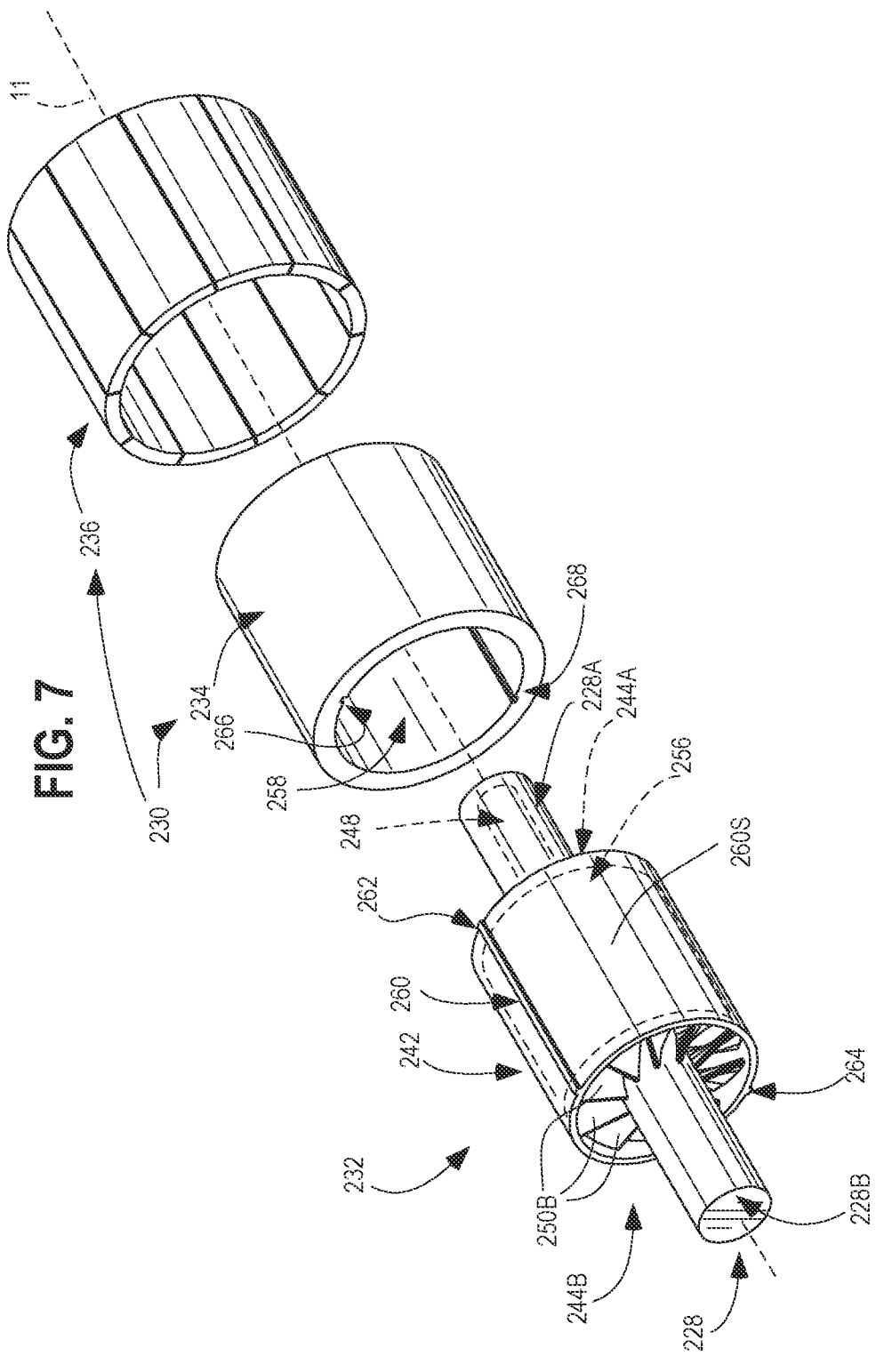
FIG. 7 is an exploded view of the rotor assembly of FIG. 6 showing the rotor hub includes a cylindrical body that extends around the axis to define a hollow cavity and a plurality of fan blades that extend radially between and interconnect the shaft and the cylindrical body so that shaft and the rotor hub are integrally formed as a single, one-piece component, and further showing the cylindrical body of the rotor hub has a key feature configured to be received in a slot formed in the rotor drum body of the magnetic rotor drum to key the rotor hub with the magnetic rotor drum.

In the illustrative embodiment, the shaft 228 includes a first segment 228A and a second segment 228B that are each coupled with rotor hub 232 on opposite sides of the rotor hub 232 as shown in FIGS. 7-9. The first segment 228A is coupled with the rotor hub 232 on a first side of the rotor hub 232. The second segment 228B is coupled with the other side of the rotor hub 232 such that the second segment 228B is spaced apart axially from the first segment 228A.

Either the first segment 228A or the second segment 228B may be formed with the cooling passage 248 that is in fluid communication with the hollow cavity 256. In the illustrative embodiment, the first segment 228A is formed to define the cooling passage 248, while the second segment 228B is formed without a cooling passage that extends therethrough and fluidly opens into the hollow cavity 256. The cooling passage 248 extends through a radial center 228C of the shaft 228 in the illustrative embodiment.

In the illustrative embodiment, the rotor hub 232 includes first and second sets of fan blades 244A, 244B as shown in FIG. 9. The plurality of first fan blades 244A includes fan blades 250A that each extend between and interconnect the first segment 228A of the shaft 228 and the cylindrical body 242. The plurality of second fan blades 244B includes fan blades 250B that each extend between and interconnect the second segment 228B of the shaft 228 and the cylindrical body 242.

Like the plurality of first fan blades 244A, the plurality of second fan blades 244B also moves air surrounding the electric machine 220 in response to rotation of the shaft 228 about the axis 11. The plurality of second fan blades 244B urges the air between the plurality of second fan blades 244B axially away from the magnetic rotor drum 230 at the second radial distance $R_2$.

Each of the blades 250A, 250B has a fan blade length 251 and a fan blade chord length (not shown). The fan blade length 251 is the length of the blade 250A, 250B from a base of the blade 250A, 250B to a tip of the blade 250A, 250B. The chord length is the length of the blade 250A, 250B from a leading edge to a trailing edge of the blade 250A, 250B.

In the illustrative embodiment, a fan blade ratio of the fan blade length 51 to the fan blade chord length is about 1. In other embodiments, the fan blade ratio may be about 0.9. In other embodiments, the fan blade ratio may be between about about 0.9 and 1.1

In the illustrative embodiment, the cooling passage 248 and the plurality of first and second fan blades 244A, 244B provide the air moving means. Rotation of the shaft 228 causes the plurality of first fan blades 244A to draw the air surrounding the electric machine 220 axially along the shaft 228 in the cooling passage 248 toward the rotor drum body 234 and into the hollow cavity 256, as suggested by arrows 238A, 238B. The air flowing through the cooling passage 248 transfers heat from the shaft 228 to the air. Simultaneously, as the air exits the cooling passage 248, the plurality of first and second fan blades 244A, 244B urge the air in the hollow cavity 256 axially away from the magnetic rotor drum 230, as suggested by arrows 40A, 40B.

In the illustrative embodiment, the shaft 228 and the rotor hub 232 are formed as a single, one-piece component as shown in FIG. 7. The first and second segments 228A, 228B of the shaft 228 are formed as a single, one-piece component with the cylindrical body 242 and first and second sets of the fan blades 244A, 244B.

The cylindrical body 242 includes a ring 260 and at least one key feature 262, 264 as shown in FIGS. 7 and 8. The keying feature 262, 264 extends radially outward from an outer surface 260S of the ring 260. The keying feature 262, 264 is configured to extend into a corresponding slot 266, 268 formed in the rotor drum body 234 of the magnetic rotor drum 230 to key the rotor hub 232 with the magnetic rotor drum 230. In the illustrative embodiment, the cylindrical body 242 includes two key features 262, 264 on opposite sides of the ring 260 that are each configured to extend into the corresponding slot 266, 268 in the rotor drum body 234.

A method of cooling the electric machine 220 includes rotating the shaft 228 of the electric machine 220 to cause the plurality of fan blades 244A, 244B to draw air axially along the shaft 228 toward the rotor drum body 234 at the first radial distance $R_1$ to transfer heat from the shaft 228 to the air. Rotation of the shaft 228 also causes the plurality of fan blades 244A, 244B to urge the air axially away from the rotor drum body 234 at the second radial distance $R_2$.

In the illustrative embodiment, the method includes drawing the air along the shaft 228 in the cooling passage 248. Rotation of the shaft 228 causes the plurality of fan blades 244A, 244B to draw air through the cooling passage 248 into the hollow cavity 256. As the air exits into the hollow cavity 256, the plurality of fan blades 244A, 244B urge the air axially away from the rotor drum body 234 on either side of the rotor drum body 234.

The present disclosure relates to an electric machine 20, 220 with integrated cooling to the rotor assembly 26 as shown in FIGS. 5 and 9. The temperature of the rotor assembly in an electric machine, especially near the bearings, may be relatively high due to no active cooling. This may reduce the operating life of the electric machine for both continuous and overloaded operating conditions later.

Other electric machine may include external fans as a separate structure. However, the external fans add additional weight. Therefore, the present disclosure relates to active cooling means which is integrated into the rotor assembly 26, 226 of the electric machine 20, 220 to optimize performance of the electric machine 20, 220.

In the illustrative embodiment of FIGS. 2-5, the rotor assembly 26 includes the rotor hub 32 having impellers 44A, 44B each coupled to a rotor end cap 42A, 42B of the rotor hub 32. The impellers 44A, 44B act as pumps, drawing air toward the rotor assembly 26.

As the rotor assembly 26 rotates, the air is driven to flow as the rotor drum body 34 to dissipate heat from the plurality of magnets 36, which reduces the temperature of the rotor assembly 26. Therefore, no external pumping means is needed to move cooling air into the rotor assembly 26, which also helps reduce the overall weight and complexity of the electric machine 20.

The impellers 44A, 44B are coupled to the rotor end caps 42A, 42B to draw cooling air through the inlet openings 52A, 52B as shown in FIG. 5. The baffles 46A, 46B separate the different flows of air 38A, 38B, 40A, 40B flowing toward and away from the rotor assembly 26 in order to prevent mixing of the two air flows 38A, 38B, 40A, 40B, which may deteriorate the efficiency of the cooling.

As the rotor assembly 26 rotates, air is drawn from the inlet openings 52A, 52B and flows along the shaft 28 in the cooling passages 48A, 48B to transfer heat and cool the rotor assembly 26. The flow is then directed radially outwards by the impellers 44A, 44B to dissipate the heat from the permanent magnets 36. The flow direction then changes and flows away from the magnetic rotor drum 30 radially outward of the baffles 46A, 46B.

The impellers 44A, 44B may be a non-magnetic material and coupled to the rotor end caps 42A, 42B. In this way, the impellers 44A, 44B may not influence the electromagnetic performance of the magnetic rotor drum 30. The impellers shape and direction angle may be optimized to further enhance the cooling of the rotor assembly 26.

In the illustrative embodiment of FIGS. 6-9, the shaft 228 has a cooling passage 248 and the hollow rotor hub 232 has fan blades 244A, 244B that draw air through the cooling passage 248 upon rotation of the shaft 228. The air drawn into the hollow cavity 256 of the rotor hub 232 cools the magnetic rotor drum 230. For embedded electrical machines 220, where the shaft diameter may be fixed and the magnetic rotor drum 230 is sized to obtain specific performance requirements, the integrated fan blades 244A, 244B allow there to be active cooling in a limited space claim.

In the illustrative embodiment, the shaft 28, the rotor drum body 34, and the rotor end caps 42A, 42B may be formed by CNC machining or milling. Similarly, the shaft 228, the cylindrical body 242, the blades 244A, 244B may be formed as a single-piece component by CNC machining or milling.

For the purposes of the present disclosure, the modifier about means±1% of the given value. Of course, greater or lesser deviation is contemplated and may be used in processed method within the spirit of this disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electric machine adapted for use in an aircraft propulsion system, the electric machine comprising a shaft extending along an axis and configured to rotate about the axis, a magnetic rotor drum that includes a rotor drum body and a plurality of magnets arranged circumferentially about the axis and coupled with the rotor drum body for rotation therewith, and a rotor hub that interconnects the shaft and the magnetic rotor drum and moves air surrounding the electric machine in response to rotation of the shaft about the axis to cool the shaft and the magnetic rotor drum, the rotor hub includes a cylindrical body that extends around the axis to define a hollow cavity and a plurality of first fan blades that extend radially between the shaft and the cylindrical body to draw air axially along the shaft toward the magnetic rotor drum at a first radial distance and transfer heat from the electric machine to the air and urge the air axially away from the magnetic rotor drum at a second radial distance greater than the first radial distance, wherein the shaft is formed to include a cooling passage that extends axially through the shaft and opens into the hollow cavity and wherein the plurality of first fan blades extend radially between and interconnect the shaft and the cylindrical body such that rotation of the shaft about the axis causes the plurality of first fan blades to draw the air axially along the shaft in the cooling passage and into the hollow cavity at the first radial distance and urge the air between the plurality of first fan blades axially away from the magnetic rotor drum at the second radial distance, wherein the shaft includes a first segment coupled with the rotor hub and a second segment spaced apart axially from the first segment and coupled with the rotor hub such that a gap is formed axially between the first segment and the second segment, and wherein the first segment is formed to define the cooling passage that is in fluid communication with the hollow cavity, the cooling passage extending axially through the first segment such that the air exits the cooling passage in an axial direction into the gap and flows into the hollow cavity, and wherein the plurality of first fan blades extend between the first segment of the shaft and the cylindrical body and wherein the rotor hub further includes a plurality of second fan blades that interconnect the second segment of the shaft and the cylindrical body and moves the air surrounding the electric machine in response to rotation of the shaft about the axis.

2. The electric machine of claim 1, wherein the second segment of the shaft is formed without a cooling passage that extends through the second segment of the shaft and fluidly opens into the hollow cavity.

3. The electric machine of claim 1, wherein the shaft and the rotor hub are integrally formed as a single, one-piece component.

4. The electric machine of claim 1, wherein the cylindrical body includes a ring and a keying feature that extends radially outward of the ring and into a slot formed in the rotor drum body to key the rotor hub with the magnetic rotor drum.

5. The electric machine of claim 1, wherein each of the blades included in the plurality of first fan blades has a fan blade length and a fan blade chord length and a fan blade ratio of the fan blade length to the fan blade chord length is about 1.

6. The electric machine of claim 1, further comprising a stator that extends circumferentially around the magnetic rotor drum, the stator including electrical windings.

7. An electric machine adapted for use in an aircraft propulsion system, the electric machine comprising a shaft extending along an axis and configured to rotate about the axis, a magnetic rotor drum that includes a rotor drum body and a plurality of magnets arranged circumferentially about the axis and coupled with the rotor drum body for rotation therewith, and a rotor hub that includes a cylindrical body and a plurality of first fan blades arranged circumferentially around the axis, the cylindrical body is coupled with the rotor drum body and extending circumferentially around the axis to define a hollow cavity therein, and the plurality of first fan blades extend radially between the shaft and the cylindrical body, wherein the shaft is formed to include a cooling passage that extends axially through the shaft and opens into the hollow cavity and wherein the plurality of first fan blades extend radially between and interconnect the shaft and the cylindrical body such that rotation of the shaft about the axis causes the plurality of first fan blades to draw the air axially along the shaft in the cooling passage and into the hollow cavity at the first radial distance and urge the air between the plurality of first fan blades axially away from the magnetic rotor drum at the second radial distance, and wherein the rotor hub further includes a plurality of second fan blades that extend between and interconnect the shaft and the cylindrical body and the plurality of second fan blades are spaced apart axially from the plurality of first fan blades.

8. The electric machine of claim 7, wherein the shaft includes a first segment coupled with the rotor hub and a second segment spaced apart axially from the first segment and coupled with the rotor hub such that a gap is formed axially between the first segment and the second segment, the plurality of first fan blades extend between and interconnect the first segment and the cylindrical body, the plurality of second fan blades extend between and interconnect the second segment and the cylindrical body.

9. The electric machine of claim 8, wherein the first segment is formed to define the cooling passage such that the cooling passage extends axially through the first segment and fluidly opens into the hollow cavity, the cooling passage extending axially through the first segment such that the air exits the cooling passage in an axial direction into the gap and flows into the hollow cavity.

10. The electric machine of claim 7, further comprising a stator that extends circumferentially around the magnetic rotor drum, the stator including electrical windings.

11. The electric machine of claim 7, wherein the cylindrical body includes a ring and a keying feature that extends radially outward of the ring and into a slot formed in the rotor drum body to key the rotor hub with the magnetic rotor drum.

12. The electric machine of claim 7, wherein the shaft, the cylindrical body, and the plurality of first fan blades are integrally formed as a single, one-piece component.

13. The electric machine of claim 7, wherein the plurality of first fan blades are configured to urge air out of the hollow cavity in a first axial direction, and the plurality of second fan blades are configured to urge the air out of the hollow cavity in a second axial direction opposite the first axial direction.

14. A method comprising providing an electric machine having a shaft, a magnetic rotor drum, and a rotor hub, the magnetic rotor drum including a rotor drum body and a plurality of magnets arranged circumferentially about an axis and coupled with the rotor drum body for rotation therewith, and the rotor hub having a cylindrical body coupled with the rotor drum body and defining a hollow cavity therein, a plurality of first fan blades that extend between and interconnect the shaft and the cylindrical body, and a plurality of second fan blades that extend radially between the shaft and the cylindrical body, rotating the electric machine such that the plurality of first fan blades and the plurality of second blades draw air axially along the shaft toward the rotor drum body at a first radial distance to transfer heat from the electric machine to the air and urge the air axially away from the rotor drum body at a second radial distance greater than the first radial distance, wherein drawing the air axially along the shaft includes drawing the air through a cooling passage formed in the shaft that extends axially through the shaft and opens fluidly into the hollow cavity such that rotation of the shaft about the axis causes the plurality of first fan blades and the second fan blades to draw the air axially along the shaft in the cooling passage and into the hollow cavity at the first radial distance and urge the air between the plurality of first fan blades and the second fan blades axially away from the magnetic rotor drum at the second radial distance, wherein the plurality of first fan blades are configured to urge air out of the hollow cavity in a first axial direction, and the plurality of second fan blades are configured to urge the air out of the hollow cavity in a second axial direction opposite the first axial direction.

15. The method of claim 14, wherein the cooling passage is defined by a first segment of the shaft coupled with the rotor hub, wherein the shaft includes the first segment and a second segment spaced apart axially from the first segment and coupled with the rotor hub such that a gap is formed axially between the first segment and the second segment, the cooling passage extending axially through the first segment such that the air exits the cooling passage in an axial direction into the gap and flows into the hollow cavity.

* * * * *